United States Patent
Lee et al.

(10) Patent No.: US 10,316,902 B2
(45) Date of Patent: Jun. 11, 2019

(54) SPLIT GROOVE WEDGE CLUTCH

(71) Applicant: SCHAEFFLER TECHNOLOGIES AG & CO. KG, Herzogenaurach (DE)

(72) Inventors: Brian Lee, York, SC (US); Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 134 days.

(21) Appl. No.: 15/464,699

(22) Filed: Mar. 21, 2017

(65) Prior Publication Data

US 2018/0274597 A1 Sep. 27, 2018

(51) Int. Cl.

| F16D 13/04 | (2006.01) |
|---|---|
| F16D 13/14 | (2006.01) |
| F16D 13/16 | (2006.01) |
| F16D 15/00 | (2006.01) |
| F16D 23/12 | (2006.01) |
| F16D 41/06 | (2006.01) |
| F16D 13/40 | (2006.01) |
| F16D 41/063 | (2006.01) |

(52) U.S. Cl.
CPC ............. *F16D 15/00* (2013.01); *F16D 13/04* (2013.01); *F16D 13/14* (2013.01); *F16D 13/16* (2013.01); *F16D 13/40* (2013.01); *F16D 23/12* (2013.01); *F16D 41/063* (2013.01); *F16D 2023/123* (2013.01)

(58) Field of Classification Search
CPC .......... F16D 13/04; F16D 13/14; F16D 13/16; F16D 15/00; F16D 23/12; F16D 2023/123
See application file for complete search history.

(56) References Cited

U.S. PATENT DOCUMENTS

| 5,067,598 | A | 11/1991 | Ritter et al. | |
|---|---|---|---|---|
| 5,485,904 | A | 1/1996 | Organek et al. | |
| 5,910,061 | A | 6/1999 | Organek et al. | |
| 5,911,643 | A | 6/1999 | Godlew et al. | |
| 6,412,618 | B1 | 7/2002 | Stretch et al. | |
| 6,666,315 | B2 * | 12/2003 | Organek | F16D 27/115 192/35 |
| 6,691,845 | B2 | 2/2004 | Showalter | |
| 7,021,442 | B2 * | 4/2006 | Borgerson | F16D 28/00 192/12 B |
| 9,016,451 | B2 * | 4/2015 | Davis | G01C 21/3632 192/41 S |
| 9,046,140 | B2 * | 6/2015 | Davis | F16D 41/08 |
| 9,470,275 | B2 | 10/2016 | Lee et al. | |
| 9,732,808 | B2 * | 8/2017 | Davis | F16D 15/00 |

(Continued)

OTHER PUBLICATIONS

International Search Report and Written Opinion for PCT/US2018/022783, dated Jul. 5, 2018, 11 pages.

*Primary Examiner* — David R Morris
(74) *Attorney, Agent, or Firm* — Brooks Kushman P.C.

(57) ABSTRACT

A clutch includes a hub and a carrier that is concentric with the hub. The carrier has a first portion and a second portion that cooperate to define an annular groove. The first and second portions are axially movable relative to each other to change a width of the groove. A wedge disk has a first edge disposed on the hub and a second edge disposed in the groove. The wedge disk is configured to couple the hub to the carrier when the clutch is locked. An actuator is configured to urge the first and second portions together to lock the clutch.

19 Claims, 4 Drawing Sheets

(56) References Cited

U.S. PATENT DOCUMENTS

| | | | |
|---|---|---|---|
| 10,012,268 B1* | 7/2018 | Lee | F16D 7/028 |
| 2005/0205377 A1* | 9/2005 | Borgerson | F16D 28/00 |
| | | | 192/48.3 |
| 2014/0014455 A1* | 1/2014 | Davis | F16D 15/00 |
| | | | 192/45.1 |
| 2014/0110207 A1 | 4/2014 | Davis | |
| 2014/0353107 A1* | 12/2014 | Hemphill | F16D 41/00 |
| | | | 192/20 |
| 2017/0356509 A1* | 12/2017 | Kurth | F16D 41/063 |
| 2018/0180105 A1* | 6/2018 | Lee | F16D 7/028 |

* cited by examiner

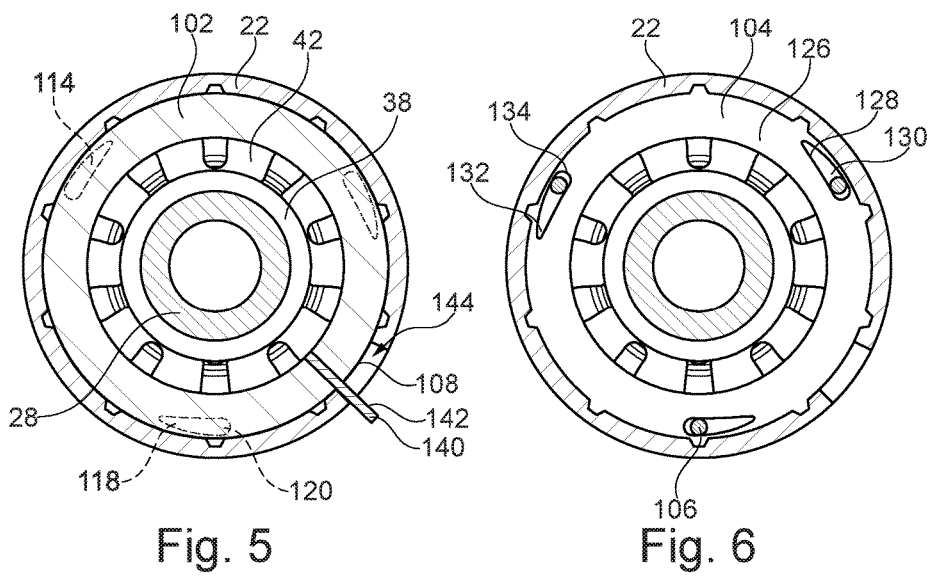
Fig. 5
Fig. 6
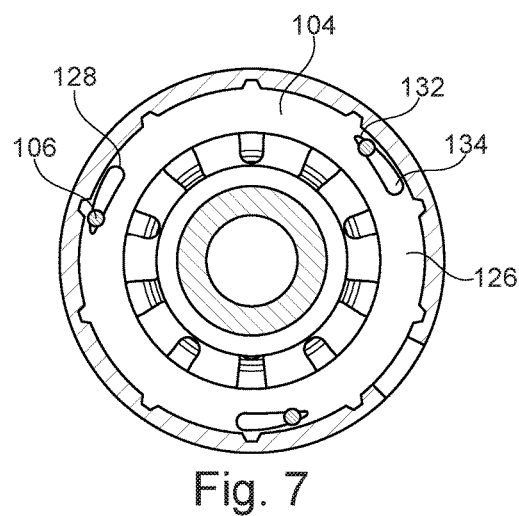
Fig. 7

US 10,316,902 B2

SPLIT GROOVE WEDGE CLUTCH

TECHNICAL FIELD

The present disclosure relates to wedge clutches for selectively coupling at least first and second components, and more specifically to wedge clutches having a carrier with a split groove that is adjustable in width to lock and unlock the wedge clutch.

BACKGROUND

A vehicle powertrain may include a wedge clutch for coupling an input shaft to an output shaft. The wedge clutch includes an inner race connected to one of the shafts and an outer race connected to the other of the shafts. A wedge disk is radially disposed between the inner and outer races and is configured to couple the inner and outer races when the clutch is locked to transmit power from the input shaft to the output shaft.

SUMMARY

According to one embodiment, a clutch includes a hub and a carrier that is concentric with the hub. The carrier has a first portion and a second portion that cooperate to define an annular groove. The first and second portions are axially movable relative to each other to change a width of the groove. A wedge disk has a first edge disposed on the hub and a second edge disposed in the groove. The wedge disk is configured to couple the hub to the carrier when the clutch is locked. An actuator is configured to urge the first and second portions together to lock the clutch.

According to another embodiment, a clutch includes a hub and a carrier having a first portion and a second portion cooperating to define an annular groove. The first and second portions are axially movable relative to each other to change a width of the groove. A wedge disk radially extends between the groove and the hub. An actuator is configured to urge the first portion towards the second portion to reduce the width of the groove to frictionally engage the groove with the wedge disk.

According to yet another embodiment, a clutch includes a hub and a carrier each supported for rotation about an axis. The carrier includes first and second axially movable rings cooperating to define a groove that encircles the hub. The carrier has a first position in which the rings are spaced apart to define a first width of the groove and a second position in which the rings are in contact with each other to define a second width of the groove that is narrower than the first width. A wedge disk includes a first edge disposed on the hub and a second edge disposed in the groove. An actuator is configured to urge the carrier to the second position to lock the clutch.

BRIEF DESCRIPTION OF THE DRAWINGS

FIG. 5 is a cross-sectional end view of the powertrain component along cutline 5-5 illustrating the wedge clutch in the unlocked state.

FIG. 6 is a cross-sectional end view of the powertrain component along cutline 6-6 illustrating the wedge clutch in the unlocked state.

FIG. 7a is cross-sectional end view of the powertrain component illustrating the wedge clutch in the locked state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
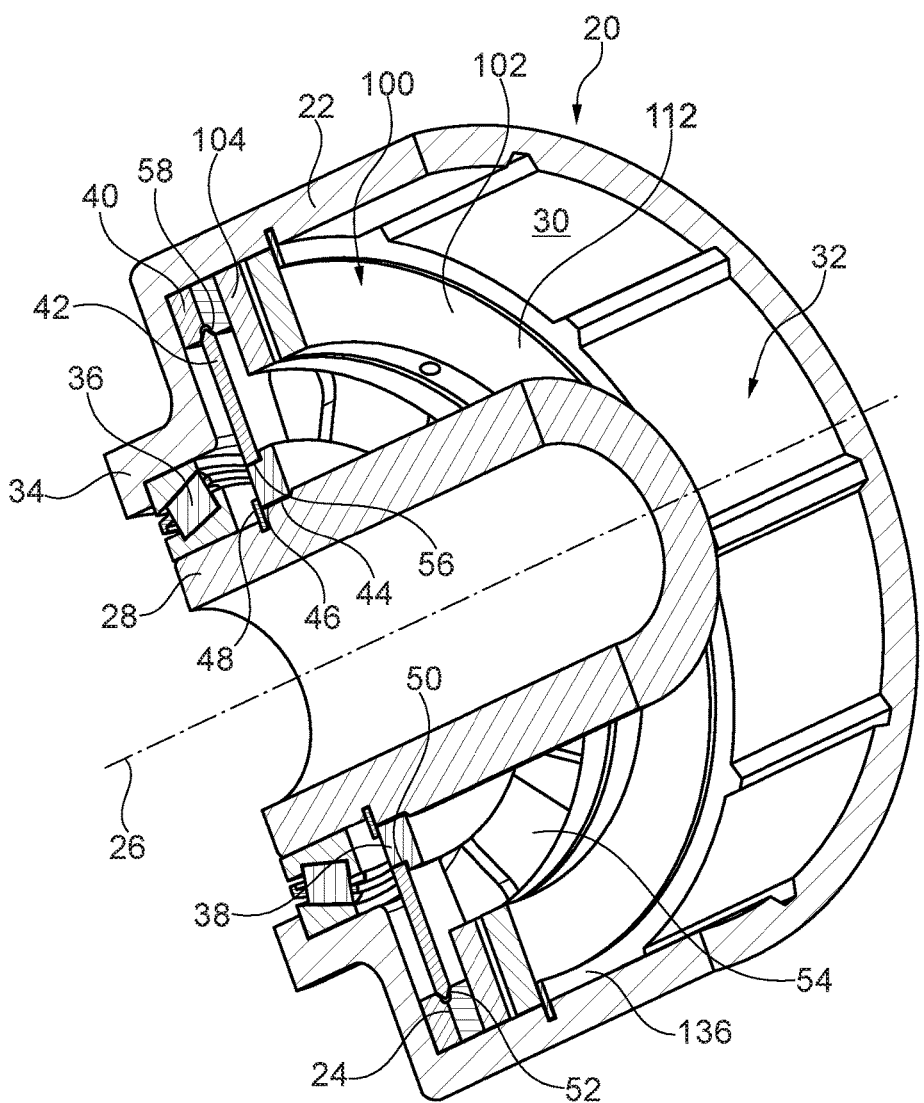
FIG. 1 is a cross-sectional perspective view of a powertrain component having a wedge clutch.
Figure 2:
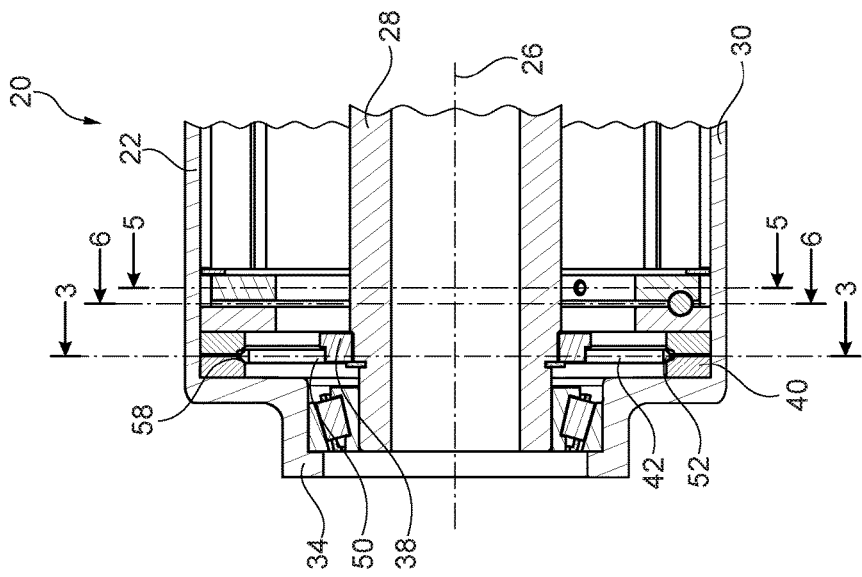
FIG. 2 is a cross-sectional side view of the powertrain component.

Referring to FIGS. 1 and 2, a powertrain component 20 for a vehicle is shown. The powertrain component 20 may be for a road vehicle such as a passenger car or pickup truck, or may be for heavy machinery such as a tractor. The powertrain component 20 may include a wedge clutch 24 operable to driveably connect two or more components to each other. Two components are driveably connected if they are connected by a power-flow path that constrains their rotational speeds to be directly proportional. For example, the clutch 24 may connect two rotatable components to each other or may act as a brake to fix a rotatable component to a stationary housing. In one example use, the wedge clutch 24 is used in a power-transfer unit of an all-wheel drive powertrain; in another example use, the wedge clutch 24 is used in a transmission. Of course, the wedge clutch 24 may be utilized in many other applications.

In the illustrated embodiment, the powertrain component 20 may include a housing 22 supported for rotation about an axis 26 and a shaft 28 that is also supported for rotation about the axis 26. The housing 22 has an inner surface 30 defining an interior 32. The shaft 28 may extend through the interior 32 and may be connected to a front portion 34 of the housing 22 by a bearing 36 allowing the shaft 28 to freely rotate relative to the housing 22. The wedge clutch 24 is operable to selectively couple the housing 22 to the shaft 28.

The wedge clutch 24 may be supported in the interior 32 of the housing and rotatable about the axis 26. The wedge clutch 24 includes a hub 38, a carrier 40, and a wedge disk 42 (also known as a wedge plate) that is radially disposed between the hub 38 and the carrier 40. The disk 42 is operable to rotationally lock the hub 38 and the carrier 40 relative to each other when the clutch is locked and to permit relative rotation between the hub 38 and the carrier 40 when the clutch is unlocked. In the illustrated embodiment, the hub 38 is fixed to the shaft 28 and the carrier 40 is fixed to the housing 22, however, the clutch can be inverted to have the hub fixed to the housing and the carrier fixed to the shaft. An example of this is described in Applicant co-pending application Ser. No. 15/388,213, filed on Dec. 22, 2016, the contents of which are hereby incorporated by reference herein in their entirety.

The hub 38 defines an inner surface 44 that is seated on an outer surface 46 of the shaft 28. A spline connection may be used to rotationally fix the hub 38 to the shaft 28. A snap ring 48 may be attached to the shaft 28 to axially restrain the hub 38. The disk 42 includes an inner edge 50, an outer edge 52, and opposing faces 54 extending radially between the inner and outer edges. The inner edge 50 is seated on an outside surface 56 of the hub 38 and the outer edge is disposed in a groove 58 of the carrier 40.

Figure 3:
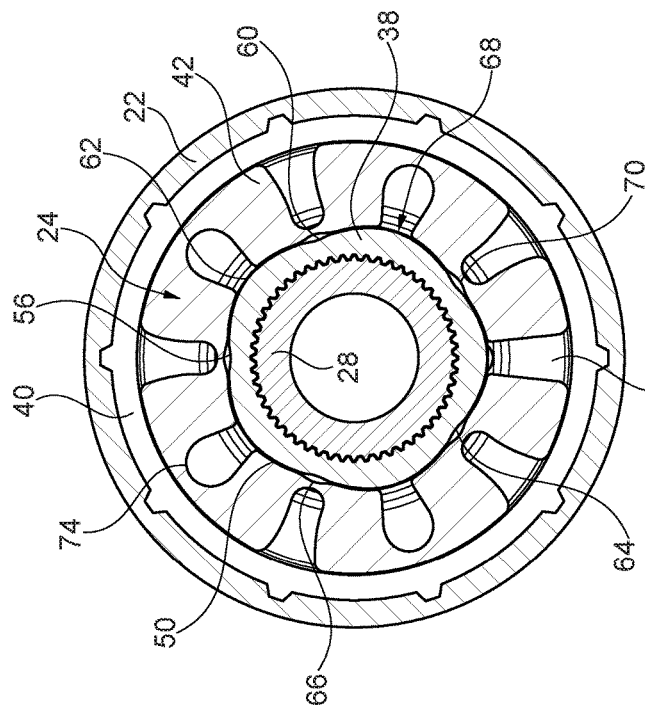
FIG. 3 is a cross-sectional end view of the powertrain component along cutline 3-3.

Referring to FIG. 3, as stated above, the clutch 24 has a locked state (also referred to as a closed state) in which the housing 22 and the shaft 28 are rotationally fixed to each other and an unlocked state (also referred to as an open state) in which the housing 22 and the shaft 28 are independently rotatable relative to each other. The outer surface 56 of the hub 38 is not a perfect circle and includes a cammed profile 60 having lobes 62 that extend radially outward from the center of the hub and valleys 64 disposed between the lobes 62. The inner edge 50 of the disk 42 also has a cammed profile 66 having pockets 68 and peaks 70 disposed between the pockets. The cammed profiles 60 and 66 have substantially matching shapes such that the lobes 62 are received in the pockets 68 and the peaks 70 are received in the valleys 64 when the hub and disk are in a first rotational position relative to each other, which corresponds to an unlocked state of the clutch. In FIG. 3, the clutch is shown in the first rotational position.

When the disk 42 and hub 38 rotate relative to each other, the cammed profiles 60, 66 become misalign, i.e., the lobes 62 slide out of the pockets 68 and the peaks 70 slide out of the valleys 64, causing the disk 42 to radially expand. Radial expansion of the disk 42 causes the disk to frictionally engage with the groove 58 of the carrier 40. The clutch 24 becomes locked when the friction force between the disk 42 and the groove 58 is sufficient to prevent rotation of the disk 42 relative to the carrier 40 and when the cammed profiles 60 and 66 cause the disk 42 and hub 38 to lock. The disk 42 may be formed of a resilient material and may include a split 72 and slots 74 to facilitate radial expansion of the disk 42. In some embodiments, the disk 42 may include multiple segments retained together by an annular resilient member. An example of this is described in Applicant co-pending application Ser. No. 15/388,297, filed on Dec. 22, 2016, the contents of which are hereby incorporated by reference herein in its entirety.

Traditional wedge clutches have a groove formed into a single solid body. As such, the groove is not designed to increase or decrease in width. Wedge clutches are self-energizing and may build up large internal forces under high torque. This makes it difficult to open the wedge clutch while it is under load. In some applications, the clutch need not be opened while under load and the solid groove may not present a problem, however, in other applications, the clutch needs to be capable of opening while under load.

Figure 4:
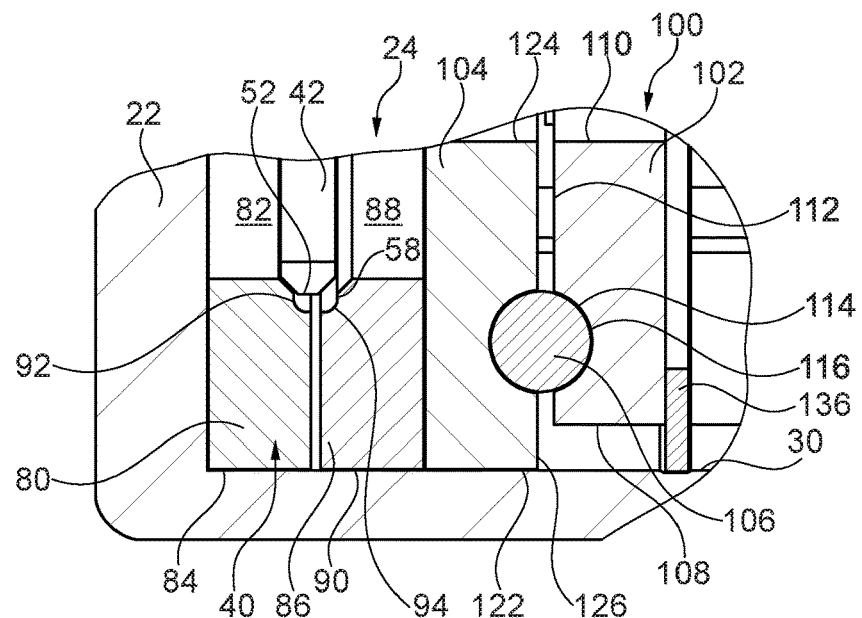
FIG. 4 is a magnified view of a portion of FIG. 2 illustrating the wedge clutch in the unlocked state.

Referring to FIGS. 2 and 4, the wedge clutch 24 has a split-groove design so that the width of the groove 58 can be adjusted allowing the clutch to be reliably opened while the clutch is under load. The carrier 40 may include a first portion and a second portion that cooperate to define the groove 58. The portions are axially movable relative to each other to adjust the width of the groove 58. In one embodiment, the carrier 40 includes a first ring 80 having an inner side 82 that faces the shaft 28 and an outer side 84 that is disposed against the inner surface 30 of the housing 22, and a second ring 86 having an inner side 88 that faces the shaft 28 and an outer side 90 that is disposed against the inner surface 30 of the housing 22. The first ring 80 defines a first portion 92 of the groove 58 and the second ring 86 defines a second portion 94 of the groove 58. The first and second portions 92, 94 may form half of the groove. The rings 80, 86 are positioned adjacent each other with the first portion 92 and the second portion 94 facing each other to define the groove 58. The first and second rings 80, 86 may be splined to the housing 22 to rotationally fix the rings while allowing the one or both of rings to axially slide towards and away from each other to increase or decrease the width of the groove 58. The first ring 80 may be stationary and held in place by a sidewall of the housing on one side and by the wedge disk 42 on the other side. The second ring 86 may be axially movable relative to the first ring 80 and may be the ring that is controlled to increase or decrease the width of the groove 58.

The relative position of the rings, and thus the width of the groove 58, is controlled by an actuator 100. The actuator 100 may be an electric actuator, a hydraulic actuator, a mechanical actuator, or any other type known in the art. The actuator 100 may be configured to slide the second ring 86 towards the first ring 80 to decrease the width of the groove 58, slide the second ring 86 away from the first ring 80 to increase the width of the groove 58, or both. In some embodiments, the actuator only slides the second ring 86 towards the first ring 80.

Referring to FIGS. 1, 4, 5, and 6, in one example embodiment, the actuator 100 is a ball-ramp actuator having a first plate 102, a second plate 104, and one or more balls 106 disposed between the plates. The first plate 102 may be disk-shaped and include an outer edge 108 disposed against the inner surface 30 of the housing, an inner edge 110 facing the shaft 28, and a face 112 extending between the inner and outer edges. The face 112 defines one or more first ball-ramp recesses 114 that have a ramped bottom surface 116 varying in depth between a shallow portion 118 and a deep portion 120. The second plate 104 may also be disk-shaped and include an outer edge 122 disposed against the inner surface 30 of the housing, an inner edge 124 facing the shaft 28, and a face 126 extending between the inner and outer edges. The face 126 defines one or more ball-ramp recesses 128 that have a ramped bottom surface 130 varying in depth between a shallow portion 132 and a deep portion 134.

The first plate 102 may be the drive plate of the actuator 100 and the second plate 104 may be the driven plate of the actuator. The first plate 102 may be axially fixed relative to the housing 22 in a manner that allows rotation of the plate 102 relative to the housing 22. For example, a snap ring 136 may be used to secure the plate 102. The second plate 104 may be splined to the housing 22 to allow axially movement of the second plate relative to the housing and to rotationally fix to the second plate 104 to the housing 22.

The first and second ball-ramp recesses 114, 128 may be substantially identical in shape and are radially positioned so that at least a portion of one of the first recess 114 is disposed over a corresponding one of the second recess 128. Each ball 106 is disposed in one of the recesses 114 and in one of the recesses 128. In the illustrated embodiment, each of the plates defines three recesses with each of the recesses receiving one of the three balls of the actuator 100.

Referring to FIGS. 5, 6, and 7, the actuator 100 may be operated by rotating the drive plate 102 relative to the housing 22, which causes the balls 106 to roll along their respective ramped surfaces. Since the recesses 114, 128 very in depth, the axial separation between the drive plate 102 and the driven plate 104 changes depending upon the position of the balls 106 in their respective recesses. The gap between the first and second plates 102, 104 is smallest when the balls 106 are located within the deep portions 120, 134 (FIG. 6) and is largest when the balls are located within the shallow portions 118, 132 (FIG. 7). The actuator 100 may be considered unactuated when the balls 106 are in the deep portions and may be considered fully actuated when the balls 106 are located in the shallow portions.

A drive mechanism 140 is used to rotate the drive plate 102 relative to the housing 22. In the illustrated embodiment, the drive mechanism 140 includes a lever arm 142 connected to the drive plate through an opening 144 defined in the housing 22. A second actuator (not shown) may be used to actuate the lever arm 142 causing the drive plate 102 to rotate.

In other embodiments, the drive mechanism 140 may be a gear train that engages with gear teeth formed on the outer edge 108 of the first plate. The gear train may include a pinion gear, a worm gear, a planetary gear set, or any other type of gearing known in the art.

Referring to FIG. 4, the clutch 24 is shown in the unlocked state with the actuator 100 in the unactuated position and with the first and second rings 80, 86 spaced apart from each other. When the carrier rings 80, 86 are spaced apart, nominal friction is created between the disk 42 and the carrier 40 allowing the housing 22 and the shaft 28 to freely rotate relative to each other.

Locking of the clutch 24 is initiated by commanding actuation of the actuator 100 to force the carrier rings 80, 86 together. The actuator 100 may be arranged in the housing 22 with the driven plate 104 disposed against the second ring 86 of the carrier 40. Rotation of the drive plate 102 forces the driven plate 104 into the second ring 86 to reduce the width of the groove 58.

The friction force between the carrier 40 and the disk 42 increases as the width of the groove 58 decreases. The friction force between the disk 42 and the carrier 40 decelerates the disk 42 causing relative rotation between the disk 42 and the hub 38. When the disk 42 and the hub 38 rotate relative to each other, the cammed profiles 60 and 66 cooperate to radially expand the disk 42 further increasing the frictional engagement with the groove 58 causing the clutch 24 to lock. The clutch 24 is considered locked when the difference in rotational speed between the hub 38 and the carrier 40 approximates zero.

Figure 8:
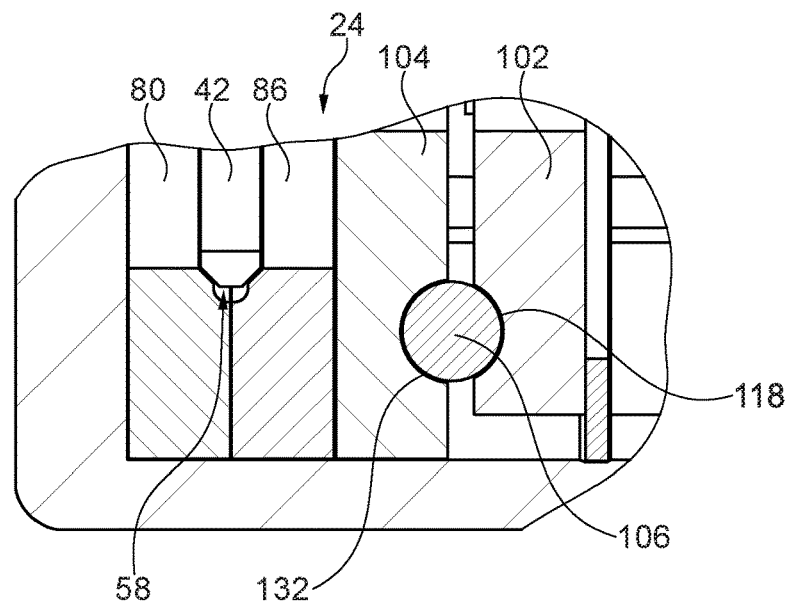
FIG. 8 is a magnified view of FIG. 2 illustrating the wedge clutch in the locked state.

FIG. 8 illustrates the wedge clutch 24 in the locked position. The drive plate 102 has been rotated to place the balls 106 in the shallow portions 118, 132 to drive the driven plate 104 into the second ring 86 of the carrier. The actuator 100 has pushed the first and second rings 80, 86 of the carrier against each other creating a minimum width of the groove 58 to lock the clutch. The clutch 24 may be unlocked by rotating the drive plate 102 in the opposite direction to release the compressive force on the first and second rings 80, 86 allowing the groove 58 to expand and disengage with the disk 42.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
   an annular housing having an inner cylindrical surface and a wall extending radially inward from the inner surface;
   a shaft supported for concentric rotation within the housing;
   a hub rotationally and axially fixed to the shaft;
   a circular carrier concentric with the hub and including a first ring having a radial face disposed against the wall and an outer surface seated on the inner cylindrical surface and a second ring having an outer surface seated on the inner cylindrical surface, the first and second rings cooperating to define an annular groove, wherein the first and second rings are axially movable relative to each other to change a width of the groove;
   a wedge disk including a first edge disposed on the hub and a second edge disposed in the groove, wherein the wedge disk is configured to couple the hub to the carrier when the clutch is locked; and
   a ball-ramp actuator including opposing first and second plates disposed in the housing such that the first plate is engageable with the second ring and including at least one ball disposed between the plates, the first plate being rotationally fixed and axially movable relative to the housing and the second plate being axially fixed and rotationally movable relative to the housing, wherein rotation of the second plate in a first direction urges the first ring into contact with the second ring to reduce the width of the groove to lock the clutch, and wherein the actuator maintains the first and second rings in contact with each other while the clutch is locked.

2. The clutch of claim 1, wherein the first and second rings are rotationally fixed relative to each other.

3. The clutch of claim 2, wherein the first ring defines a first half of the groove and the second ring defines a second half of the groove.

4. The clutch of claim 1, wherein rotation of the second plate in a second direction permits the second ring to axially move away from the first ring to increase the width of the groove to unlock the clutch.

5. The clutch of claim 1, wherein at least one of the first and second plates defines a ball ramp recessed into a face of the plate and having a variable depth, wherein the ball is disposed in the ball ramp, and the ball ramp actuator is configured such that rotation of the plates relative to each other forces one of the plates into the carrier to reduce the width of the groove.

6. The clutch of claim 5, wherein both of the first and second plates defines at least one ball ramp.

7. The clutch of claim 1, wherein the hub defines an outer surface with a first cammed profile projecting radially outward, and the first edge defines a second cammed profile that cooperates with the first cammed profile to radially expand the wedge disk into frictional engagement with the groove to lock the clutch when the wedge disk and the hub rotate relative to each other.

8. The clutch of claim 7, wherein the cammed profiles are configured to bidirectionally lock the clutch.

9. A clutch comprising:
   a shaft;
   a hub rotationally and axially fixed to the shaft;

a carrier including a first ring and a second ring cooperating to define an annular groove, wherein the first and second rings are axially movable relative to each other to change a width of the groove;

a wedge disk radially extending between the groove and the hub, the wedge disk including an inner edge seated on the hub and an outer edge disposed in the groove; and an actuator configured to urge the first ring towards the second ring to reduce the width of the groove to frictionally engage the groove with the wedge disk to lock the clutch, wherein the actuator maintains the first and second rings in contact with each other when the clutch is locked.

10. The clutch of claim 9, wherein the actuator includes adjacent first and second plates and a ball disposed between the plates.

11. The clutch of claim 10, wherein at least one of the plates has a face defining a recess with a ramped surface that receives the ball, the recess being configured such that rotation of the first plate relative to the second plate causes the ball to move along the ramped surface and project out of the recess to urge the first and second plates apart causing the first plate to force the second ring towards the first ring reducing the width of the groove.

12. The clutch of claim 9, wherein the first and second rings are rotationally fixed relative to each other.

13. The clutch of claim 9, wherein the annular groove encircles the hub.

14. The clutch of claim 9, wherein the hub defines first cams and the wedge disk defines second cams, and the first and second cams cooperate to radially expand the wedge disk into frictional engagement with the groove to lock the hub to the carrier in both rotational directions when the wedge disk and the hub rotate relative to each other.

15. A clutch comprising:

a hub supported for rotation about an axis;

a carrier supported for rotation about the axis and including first and second axially movable rings cooperating to define a groove that encircles the hub, wherein the carrier includes a first position in which the rings are spaced apart to define a first width of the groove and a second position in which the rings are in contact with each other to define a second width of the groove that is narrower than the first width;

a wedge disk including a first edge disposed on the hub and a second edge disposed in the groove; and an actuator configured to urge the carrier to the second position to fully lock the clutch, wherein the actuator maintains the first and second rings in the second position while the clutch is fully locked.

16. The clutch of claim 15, wherein the wedge disk is configured to radially expand in response to rotation of the wedge disk relative to the hub to bidirectionally lock the clutch.

17. The clutch of claim 15, wherein the actuator includes adjacent first and second plates and a ball disposed between the plates.

18. The clutch of claim 17, wherein the actuator is adjacent the carrier, and the actuator is configured such that rotation of the first plate relative to second plate urges the plates apart causing the carrier to move to the second position to lock the clutch.

19. The clutch of claim 15 further comprising an annular housing defining an interior that receives the hub, the carrier, the wedge disk, and the actuator therein, and wherein the carrier is rotationally fixed to the housing.

* * * * *